(12) United States Patent
Rollins et al.

(10) Patent No.: US 8,201,085 B2
(45) Date of Patent: Jun. 12, 2012

(54) METHOD AND SYSTEM FOR VALIDATING REFERENCES

(75) Inventors: Jason E. Rollins, Philadelphia, PA (US); Noah J. Merritt, Charlottesville, VA (US)

(73) Assignee: Thomson Reuters Global Resources, Baar (CH)

( * ) Notice: Subject to any disclaimer, the term of this patent is extended or adjusted under 35 U.S.C. 154(b) by 988 days.

(21) Appl. No.: 11/820,842

(22) Filed: Jun. 21, 2007

(65) Prior Publication Data
US 2008/0320579 A1    Dec. 25, 2008

(51) Int. Cl.
*G06N 3/00* (2006.01)
(52) U.S. Cl. ...................................... 715/255
(58) Field of Classification Search .................. 715/234, 715/243, 254, 255
See application file for complete search history.

(56) References Cited

U.S. PATENT DOCUMENTS

| | | | |
|---|---|---|---|
| 5,802,493 A * | 9/1998 | Sheflott et al. ................. | 705/1.1 |
| 6,490,603 B1 | 12/2002 | Keenan et al. | |
| 7,136,178 B1 | 11/2006 | Gupta et al. | |
| 7,904,806 B2 * | 3/2011 | Muschett ...................... | 715/236 |
| 2003/0001873 A1 | 1/2003 | Garfield et al. | |
| 2006/0010145 A1 | 1/2006 | Al-Kofahi et al. | |
| 2006/0218492 A1 * | 9/2006 | Andrade ........................ | 715/523 |
| 2006/0248123 A1 | 11/2006 | Butash et al. | |
| 2007/0172062 A1 * | 7/2007 | Waldo et al. .................. | 380/252 |

OTHER PUBLICATIONS

Aries Systems Corp., Copyright 2006—http://www.editorialmanager.com/robohelp/4.0/Reference_Cleanup_Instructions_for_Users.htm; pp. 1-4.
Aries Systems Corp., Copyright 2006—http://www.editorialmanager.com/robohelp/5.0/extyles_reference_cleanup.htm; p. 1.
Parity Computing, Inc., Copyright 2007—http://www.paritycomputing.com/web/products/reference_processor.html; p. 1.
Allen Press Inc., Copyright 2005—http://www.allenpress.com/allen_press/gen/allen_press_generated_ns_pages/Allen_TurnStyle_m101.html; pp. 1-2.
Aries Systems Corporation, Copyright 2006—http://www.editorialmanager.com/robohelp/4.0/eXtyles.htm; pp. 1-2.
eXtyles Product Overview—Order out of Chaos, Editorial and XML Tools for Microsoft Word; Oct. 2004; Copyright 2000-2004 Inera Inc.; pp. 1-14.
Inera Inc. Innovative Software Solutions for Publishers—web pages from www.inera.com/resources.shtml; http://dtd.nlm.nih.gov; and www.inera.com/nlmresources.shtml; 8 pages.

\* cited by examiner

*Primary Examiner* — Kyle Stork
(74) *Attorney, Agent, or Firm* — Valenti, Hanley & Robinson, PLLC; Kevin T. Duncan

(57) ABSTRACT

The present invention relates to enhanced workflow solutions for authors (e.g., researchers, scientists, and scholarly authors) and publishers (e.g., journals and professional and technical societies) in preparing documents in structured format for facilitating efficient and accurate validation of references cited or included in papers and other submissions for publication or for review. An author prepares a document containing a set of cited references using a formatting structure. A system includes a processor to process the document to extract embedded metadata associated with the set of cited references. The processor executes code associated with a reference validation software module and automatically recognizes the formatting structure and the embedded metadata. The processor automatically extracts the embedded metadata and compares the extracted metadata against an authority database to determine the validity of the set of cited references.

43 Claims, 5 Drawing Sheets

METHOD AND SYSTEM FOR VALIDATING REFERENCES

FIELD OF THE INVENTION

The field of the invention relates generally to information science and infometrics (or informetrics) and more particularly to the fields of bibliometrics and scientometrics and validating reference information included in works of authorship.

BACKGROUND OF THE INVENTION

With the advents of the printing press, typeset, typewriting machines, and computer-implemented word processing and storage, the amount of information generated by mankind has risen dramatically and with an ever quickening pace. As a result there is a continuing and growing need to accurately collect and store, identify, track, classify and catalogue for retrieval and distribution this growing sea of information.

In the area of scholarly and scientific research and writing a sophisticated process and convention for documenting research, supporting materials and organizing fields of study has emerged called "bibliographic citation." Such scientific writings include, among other things, books, articles published in journals, magazines or other periodicals, manuscripts, and papers presented, submitted and published by society, industry and professional organizations such as in proceedings and transactions publications. To facilitate the widespread distribution of information published in scholarly writings to more efficiently and effectively move bodies of study forward, scholars and scientists use bibliographic citation to recognize the prior work of others, or even themselves, on which advancements set forth in their writings are based. "Citations" or "cited references," as included in any particular work or body of work, is used herein to refer broadly to cited references, bibliographic or other reference data, that collectively form in-text citations, footnotes, endnotes, and bibliographies and are used to identify sources of information relied on or considered by the author and to give the reader a way to confirm accuracy of the content and direction for further study. A "bibliography" may refer to either of a complete or selective list or compilation of writings specific to an author, publisher or given subject, or it may refer to a list or compilation of writings relied on or considered by an author in preparing a particular work, such as a paper, article, book or other informational object.

Citations briefly describe and identify each cited writing as a source of information or reference to an authority. Citations and bibliographies follow particular formatting conventions to enhance consistency in interpreting the information. Each citation typically includes the following information: full title, author name(s), publication data, including publisher identity, volume, edition and other data, and date and location of publication. Given the formatting requirements and numerous fields associated with each citation and given that there are tens and in some cases hundreds of citations in a given paper, the likelihood of misspellings and typographical errors presents a substantial problem in the publishing and research processes. Perhaps other than the title associated with a given paper, most of the fields are inherently ambiguous. For example, even the volume, page and date fields or data for a given reference is not particularly helpful in the event of an error. As opposed to the title information, where one letter missing or misspelled in one word from a string of words still leaves usable information, a missing or erroneous date or volume character makes the rest of the data largely useless or at least unreliable. Also, author names are most usually in an abbreviated form, such as an initial rather than full first or middle names (e.g., J. Smith), or suffer naturally from commonality with other authors, such as having either a common first or last name or both e.g., John Smith. This results in a latent ambiguity as to the actual identity of the author. There have been many attempts to disambiguate author and other citation information. A system and method for disambiguating information is disclosed in U.S. Ser. No. 11/799,768, filed May 2, 2007, entitled Method and System for Disambiguating Information Objects, which is owned by the assignee of the present application and is hereby incorporated herein by reference.

In support of the pursuits of science and research databases, database management tools, citation management and analysis tools, research authoring tools, and other powerful tools and resources have been used and developed for the beneficial use of scholars, researchers, and scientists. These tools and resources may be available to users in an online environment, over the Internet or some other computer network, and may be in the form of a client-server architecture, central and/or local database, application service provider (ASP), or other environment for effectively communicating and accessing electronic databases and software tools. Examples of such tools and resources are Thomson Scientific's Web of Science™ (WoS), Web of Knowledge™ (WoK), and ResearchSoft™ suite of publishing solutions including, EndNote™, EndNoteWeb™, ProCite™, Reference Manager™, and RefViz™, as well as solutions such as Scholar One's Manuscript Central™. A longstanding problem in the publication process has been accurately entering citation information in papers during creation and the time consuming and tedious process of manually verifying the accuracy of the citation prior to publication. Small but critical errors, such as incomplete information and incorrect information (e.g., misspellings and typographical errors) cause the author and publisher to lose credibility and cause the reader to waste effort searching for the referenced material incorrectly cited in the document.

Techniques used to help build out databases and confirm database information include extraction and sorting, such as parsing of data from sentence or word structures, performed on electronic documents to extract information from papers and citations for further processing.

"Writings," "manuscripts," and "papers," as used herein shall refer to both "hard" documents and "soft" electronic documents and shall be used interchangeably and given the broadest collective meaning. Such works of authorship are now widely created, edited, maintained, archived, catalogued and researched in whole or in part electronically. The Internet and other networks and intranets facilitate electronic distribution of and access to such information. The advent of databases, database management systems and search languages and in particular relational databases, e.g., DB2 and others developed by IBM, Oracle, Sybase, Microsoft and others, has provided powerful research and development tools and environments in which to further advance all areas of science and the study of science. There are companies and institutions that have created electronic databases and associated services, such as WoS and WoK, that are specifically designed to help organize and harness the vast array of knowledge.

Thousands of papers and manuscripts are submitted to reviewers and publishers daily by authors and many of the submissions include malformed references. To catch and correct these errors, the current path to publication usually includes a manual reference validation step consisting of checks for style and content accuracy. The validation task may be performed by a variety of roles, most commonly by a copy editor or a production editor, but also possibly by a typesetter. With papers and manuscripts commonly containing dozens (or hundreds) of cited references, the validation process is tedious and time-consuming, and adds significant costs to the publication process, having been estimated to account for up to 60% of a publisher's correction and formatting effort.

Recent developments have provided a significant opportunity to develop reference validation tools within the context of manuscript creation, submission, approval, proofing, and production processes. Many reference databases, which may be referred to herein as authority databases, have become available via web service connections. It is now possible to efficiently pull or extract reference lists from a manuscript or electronic document into XML. Also, processes used in the paper creation and submission process may be extended into the production stage of the publishing process to provide a complimentary, coordinated and efficient overall process.

Robust and accurate reference mark-up and validation tools are needed to effectively reduce the cost and burden associated with validating references prior to publication.

Existing effort and systems directed to "validation, XML, scholarly meta data, etc." include the following. XML validation, which presently applies to the validation of the XML tags and schema in a document and not to validating the associated data. Scholarly meta data and linking refers to for example the creation of a Digital Object Identifier (DOI) or unique digital identifier for a specific scholarly work, for example a URL. DOI may be used to identify content objects in a digital environment. Entities operating over digital networks are assigned DOI "names," and have associated with them "current" information, including address information. Name information does not change but other information, e.g., address, may change over time. A DOI system provides a framework for managing the following: identification, content; metadata, links, and media.

SUMMARY OF THE INVENTION

The present invention provides enhanced workflow solutions for authors (e.g., researchers, scientists, and scholarly authors) and publishers (e.g., journals and professional and technical societies) in validating references cited or included in papers and other submissions for publication or for review. The invention accelerates the time to publish or market papers, journals, meeting abstracts, and conference proceedings and delivers significant productivity gains in the process. The invention enables users to access research and other productivity solutions remotely, such as via the Internet, across the world. The invention provides value-added information, with software tools and applications that help users become better informed and make better decisions and do both more efficiently. Although the invention may be described herein in the context of scientific research, the invention is also applicable in other applications and environments, including assisting users in the fields of law, tax, accounting, higher education, reference information, corporate e-learning and assessment, financial services, and healthcare.

In one embodiment, the present invention provides an integrated or integrate-able system of research and authoring productivity software for use in conjunction with databases of interest, e.g., WoS, WoK, CrossRef, and PubMed. By way of example, Thomson Scientific applications EndNote®, EndNote Web™, ProCite®, Reference Manager®, RefViz™, Abstract Central™, Proceedings Central™, and Manuscript Central™ are commercially available systems that may be used to provide a comprehensive solution to create, write, publish, submit, and manage bibliographies, papers, publications, and other scholarly pursuits. Many of the functions included in this system of solutions may be automated. The invention may be used with one or more or a combination of such solutions. Manuscript Central provides a web-based, database-driven peer review and online submission solution for scholarly publishers. Manuscript Central automates manuscript submission to journals and allows for easy administrative, editing and reviewing capabilities.

EndNote®, ProCite® and Reference Manager® are desktop applications, but may also be browser-based applications, used to publish and manage bibliographies. With these products users, e.g., students writing papers, professionals publishing research, can, for example, do the following: search Internet databases to build personal reference libraries; import references from online and CD-ROM databases and library catalogs; format bibliographies automatically for hundreds of scholarly publications; use Cite While You Write™ feature with Microsoft® Word® to create bibliographies instantly as references are cited. EndNote Web is a Web-based tool for managing and citing references in papers and creating bibliographies. Integrated seamlessly with EndNote desktop and the ISI Web of Knowledge$^{SM}$ research platform, EndNote Web provides an online collaborative environment for existing EndNote users, and an entree for undergraduate students requiring a basic bibliographic solution. RefViZ™ provides a text analysis and visualization tool and works seamlessly with EndNote, ProCite and Reference Manager to provide a powerful way to explore reference libraries visually for major themes and topics. RefViz allows users to quickly evaluate vast amounts of references, accelerating the research process.

In one embodiment, the invention automatically validates references cited. As used to describe the invention, validating a reference does not merely mean to check citation format but rather means to validate that the cited reference actually exists and was published as cited. The difference is that a reference may be in appropriate format but yet may not relate to an existing publication. The goal of the invention is to confirm the accuracy of the submitted data. It is important to confirm that references identified in submitted papers exist so that readers can use the cited references to obtain copies of the referenced material to verify that the reference stands for the proposition as represented in the citing paper and to use the reference to facilitate further research. The validation process of the invention is to confirm that the cited reference actually exists. Validation means to confirm that the title, author, citation and other data appearing in the cited reference is accurate and not merely that it is in proper format. In this manner, simple errors, wholly incorrect cites, and fraudulent representations may be discovered and acted upon.

After running the validation process on a submitted paper or extracted reference list, the system can respond to the user or other concern involved in the process (e.g., peer review board) in any of a number of ways. For example, the system can give an indication of verification, identify which references have or have not been validated, delineate the data or fields in the cited reference or document that appear to be incorrect, and suggest closely matching reference data as a substitute for the erroneous data. The system can also include hyperlinks, for example, associated with the cited references to directly link the results page with the actual, confirmed reference or a suggested reference. The invention is not limited to validating authors, citations, dates, etc. and can be used to validate any feature appearing in a cited reference or even a paper for which there is a corresponding authority database against which the data may be compared. For example, if an author claims to be a "Fellow" or "Member" of a society, e.g., IEEE, or a member of the faculty of a school or in a chaired position, for example, then as long as the system has access to an authority database of membership data for that society or faculty, the information from the paper or other document may be extracted, marked-up or otherwise, and may be compared against the database and the data validated. In addition, these processes may be used to validate that the paper has not previously been published. As part of the process, a user can select from a list of databases against which the validation process is to be performed or the system may default to a predefined set of one or more databases. Exemplary databases for use with the present invention include public reference databases; e.g., CrossRef, and PubMed; commercial databases; e.g., Web of Science (WoS), Web of Knowledge (WoK), and BIOSYS; and privately held specialized databases.

In one embodiment, the invention provides a computer-based method for preparing a document for publication. The method includes receiving an electronic document previously prepared by an author using a formatting structure, the electronic document including a set of cited references and having metadata associated with the set of cited references embedded in accordance with the formatting structure. The method further includes executing on the electronic document a reference validation process adapted to recognize the formatting structure and the embedded metadata and further adapted to extract the embedded metadata and compare the extracted metadata against a set of at least one authority database to determine the validity of the set of cited references. In addition, this embodiment of the invention may include generating an output comprising data representing the validity determination. The output may further include data representing an option to revise invalid cited reference data and may involve presenting the output to one or both of the author and a publisher for revising at least one invalid cited reference datum and generating a revised set of data. The method may further include executing on the revised set of data the reference validation process for further validation.

In this embodiment the output may comprise data respecting one or both of at least one valid cited reference and at least one invalid cited reference and comprise at least one of the following: error data; suggested correction data; and data related to confirmed citations that match closely with data from the set of cited references. The electronic document may be received by a publisher, who causes the reference validation process to be executed on the electronic document prior to publication of the electronic document. The method may further comprise parsing data from the set of cited references and comparing the parsed data with data from the set of at least one authority database to determine the validity of the parsed data. In the method, the set of at least one authority database may include at least one of the following databases: ISI Web of Science, ISI Web of Knowledge, National Library of Medicine PubMed, CrossRef, BIOSIS, Dialog, library OPACS, Medline, ProQuest, Ovid, Ebsco, and WilsonWeb. Also, the electronic document may be received from an author and the method performed to validate the set of cited references contained in the electronic document prior to submission of the electronic document to a publishing entity. The method may further comprise: creating the electronic document according to the formatting structure including inserting the embedded metadata in the electronic document. In this method the electronic document may include formatted data elements associated with citation information associated with the set of cited references, the method may further comprise parsing the formatted data elements based on the formatting structure to yield parsed data and comparing the parsed data with data from the set of at least one authority database to determine the validity of the parsed data. In this method the formatting structure may be a markup process based on one of XML, GML, and SGML. The method may further involve establishing a communication link with the set of at least one authority database over at least one computer network. In this method, the set of cited references may comprise one or more of citation data, author data, publication source data, address data, volume data, ISSN, volume, issue, page, DOI, URL, and date of publication data. The method may further comprise: determining a set of at least one invalid data from the set of cited references; revising at least a portion of the set of at least one invalid data to form a set of revised data; and automatically comparing the set of revised data against the set of at least one authority database to determine the validity of the set of revised data. The method may further comprise: determining a set of at least one invalid data from the set of cited references; presenting a user with the set of at least one invalid data; receiving from the user a set of revised data; and automatically comparing the set of revised data against the set of at least one authority database to determine the validity of the set of revised data.

In another embodiment, the present invention provides a System for preparing electronic documents for publication. The system includes a processor adapted to process at least one electronic document containing a set of at least one cited reference, the electronic document being previously prepared by an author using a formatting structure and having metadata associated with the set of at least one cited reference embedded in accordance with the formatting structure; and a reference validation software module comprising code executed by the processor and adapted to automatically recognize the formatting structure and the embedded metadata and further adapted to automatically extract the embedded metadata and compare the extracted metadata against a set of at least one authority database to determine the validity of the set of at least one cited-reference. In the system, the set of at least one authority database may include at least one of the following databases: ISI Web of Science, ISI Web of Knowledge, National Library of Medicine PubMed, CrossRef, BIOSIS, Dialog, library OPACS, Medline, ProQuest, Ovid, Ebsco, WilsonWeb, and a journal-configured external database. In the system, the reference validation software module may be further adapted to determine the presence of a set of at least one invalid data from the set of at least one cited reference, process a set of revised data; and automatically compare the set of revised data against the set of at least one authority database to determine the validity of the set of revised data. In the system, the set of at least one invalid data may be presented to a user, who may revise at least a portion of the set of at least one invalid data to form the set of revised data. In the system, the formatting structure is based on one of XML, GML, and SGML.

The system may further comprise an output software module comprising code executing on the processor and adapted to automatically generate an output respecting the validity of the set of at least one cited reference. In the system, the output may comprise data respecting one or both of at least one valid cited reference and at least one invalid cited reference. In the system the output may include data representing one or both of a match or a failure to match between the set of at least one cited reference and the valid reference data. In the system the reference validation software module may further comprise code executed by the processor and adapted to automatically determine a similarity between each of the set of at least one cited reference and the valid reference data, and wherein the output includes data respecting at least one possible match between the set of at least one cited reference and the valid reference data. In the system the output may indicate those of the set of at least one cited reference having one or more possible matches with the valid reference data and presents the possible matches for selection by a user. In the system the output may be presented to a user for action and the user provides at least one response respecting validation of the set of at least one cited reference. In the system the at least one user response may include at least one of a verification, a repudiation, or selection respecting the at least one possible match.

The system may further comprise: an author computer adapted to structure the electronic document according to the formatting structure; and a central computer comprising the processor and being adapted to receive the electronic document. In the system the central computer may further comprise a parser adapted to parse data contained in the electronic document associated with the set of at least one cited reference to yield parsed cited reference data, and wherein the reference validation software module uses the parsed cited reference data to compare the set of at least one cited reference against the set of at least one authority database. In the system at least one of the author computer and the central computer may be adapted to process the electronic document using a structured format language. In the system the reference validation software module may be adapted to extract the metadata into XML. In the system the set of at least one authority database may include at least one journal-configured external database. In the system the reference validation software module may be further adapted to present to a user data related to the validity determination and to receive from the user verification data associated with the set of at least one cited reference. In the system the data related to the validity determination may include data representing authenticated references contained in the set of at least one authority database and having high similarity with at least a portion of the set of at least one cited reference. In the system the verification data may be used to revise the electronic document.

BRIEF DESCRIPTION OF THE DRAWING

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

As described herein, the term "item" and the terms "writing", "manuscript", "paper", and "article" shall be understood to refer to hard and soft documents, papers, writings, and other publications and are all meant to each inherently refer to the other terms as the invention is intended to cover all sorts of publications, papers, writings, articles, letters, editorials, books, chapters, or other kinds of published papers or documents. Part of the information captured, for instance in extracting information from an item, is the item's bibliography of cited references. Items in such bibliographies may be referred to as "reference items". Some reference items may be items captured as a source item but not necessarily.

Figure 1:
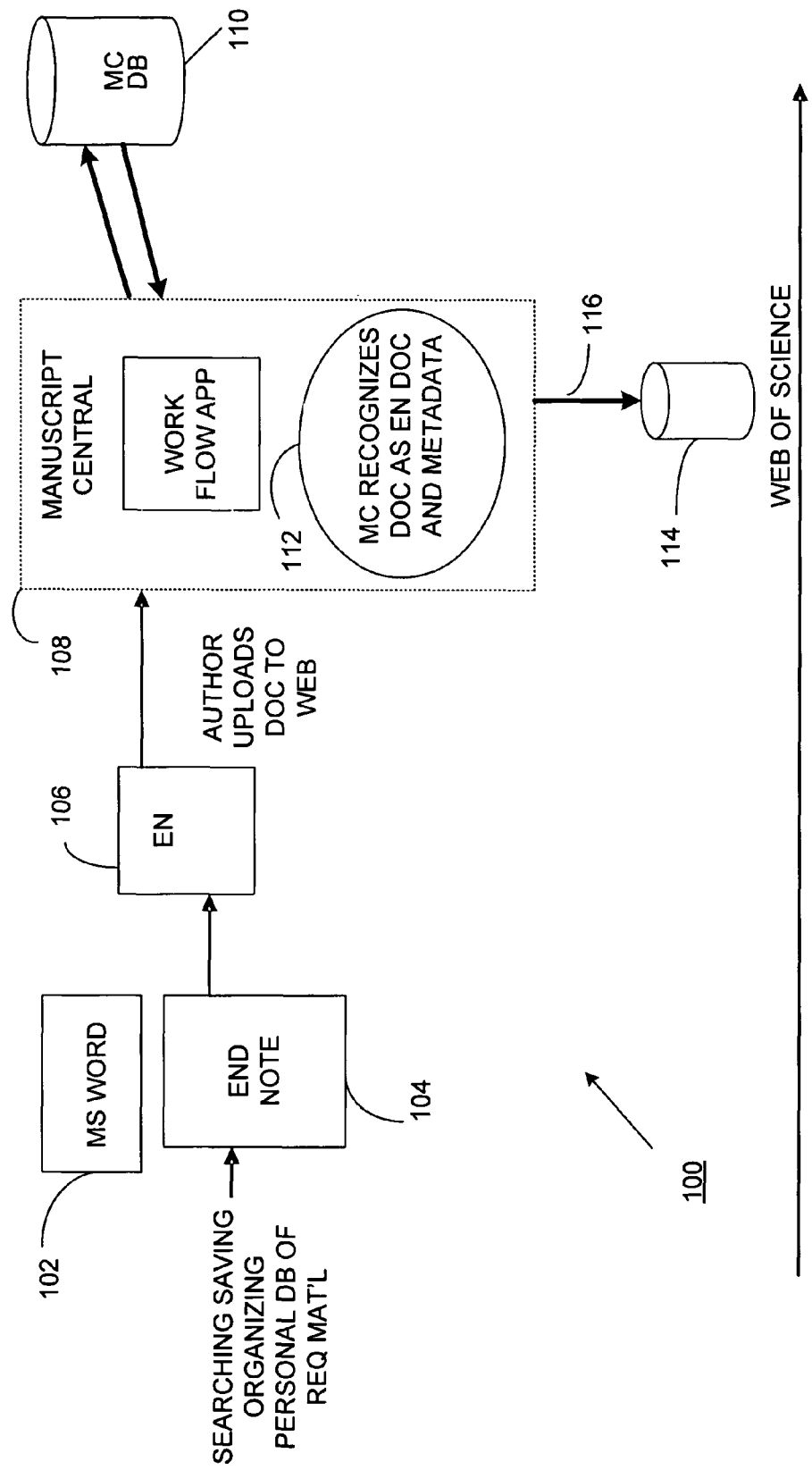
FIG. 1 is a schematic diagram illustrating a first exemplary system for tagging, extracting, and validating cited references using the present invention.

With reference to FIG. 1, an authoring, submission, and validation system 100 includes a word processing application 104, e.g., EndNote using EndNote XML reference mark-up, for preparing structured formatted documents. The software application 104 is used to format the Microsoft Word document 102 by identifying and tagging data contained in the document prior to submission to a publisher. For instance documents may be marked or tagged using, by way of example only and not limitation, processes based on GML, SGML or XML. By marking or tagging the document to create a structured document, e.g., using GML, SGML or XML based mark-up, the cited references may be more easily extracted from the document and included in a reference list for validation. SGML, Standard Generalized Markup Language, is a generic markup language used to represent documents in content and structure. SGML identifies document elements such as titles, paragraphs, tables, and chapters as distinct objects and allows users to define relationships, defined in a Document Type Definition (DTD), between objects for structuring data in documents. SGML may be compared with SQL (standard language for creating, updating and querying relational database management systems) in that SGML document elements and structure are analogous to a collection of field definitions in a database. SGML enables users to structure information in documents in an open fashion to permit access and reuse by any SGML "aware" application across multiple platforms. Once converted into SGML, the document has tagged information and becomes a database-like document that may be searched, printed and processed by SGML "aware" applications in an open fashion. Extensible Markup Language (XML), a simplified dialect of SGML, is a markup language for representing documents and is suitable for use on the World Wide Web (WWW). XML provides a relationship between a document's content and embedded structure and a way to share document-based information across applications and platforms. Structured information may have multiple components, e.g., words, and pictures, and include indications as to what the content represents, e.g., title, section heading, footnote, endnote, reference, caption, and database table).

In keeping with the invention, a structured document may be formatted according to specific bibliographic style using application 104 functions. For instance, the EndNote Tool Bar may be invoked to call up APIs (application programming interfaces) of MS Word hidden code fields. The structured Word document 106 may be loaded or uploaded into a work flow system 108, e.g., Manuscript Central, that is in communication with a database 110. The system 108 includes software 112 for recognizing the structured document 106 as being formatted in a particular way, e.g., EndNote, then it may pull or extract the references contained in the document 106 using means for parsing the data using a reference XML, e.g., EndNote XML reference. For example, the cited references may be parsed from the document and included in a reference list for validation. System 108 preferably is capable of recognizing multiple formats and extracting references structured in a variety of formats. For those documents that are not structured, prior to the validation process a manual operation or software-aided operation may be applied to a document to identify and extract cited references or portions of text. Once the reference data is extracted or otherwise placed in a condition for comparison, One or more database links 116 are established to compare the extracted reference data against valid reference data contained in the one or more external database 114, e.g., WoS. Database 114 serves as an authority database containing verified and reliable reference data. Rather than establishing a link to an external authority database, a reliable database may be present local to the work flow system 108, e.g., database 110.

The system 100 may apply an automated process to parse out data to be validated from documents that are structured and that have metadata tags that identify the cited references. In the "extraction" process the parser preferably recognizes or has access to the one or more formatting syntax, e.g., EndNote reference XML, used to code or format the document by the application 104 and is capable of identifying those fields in the document that are associated with a cited reference or other field of interest. The system 100 may include "parsing" options to select a parser or a parser set-up appropriate for the source of the document or the source of the formatting. Also, journals or other publishers may require submitting authors to submit papers pre-formatted using a particular reference management mark-up strategy.

Figure 2:
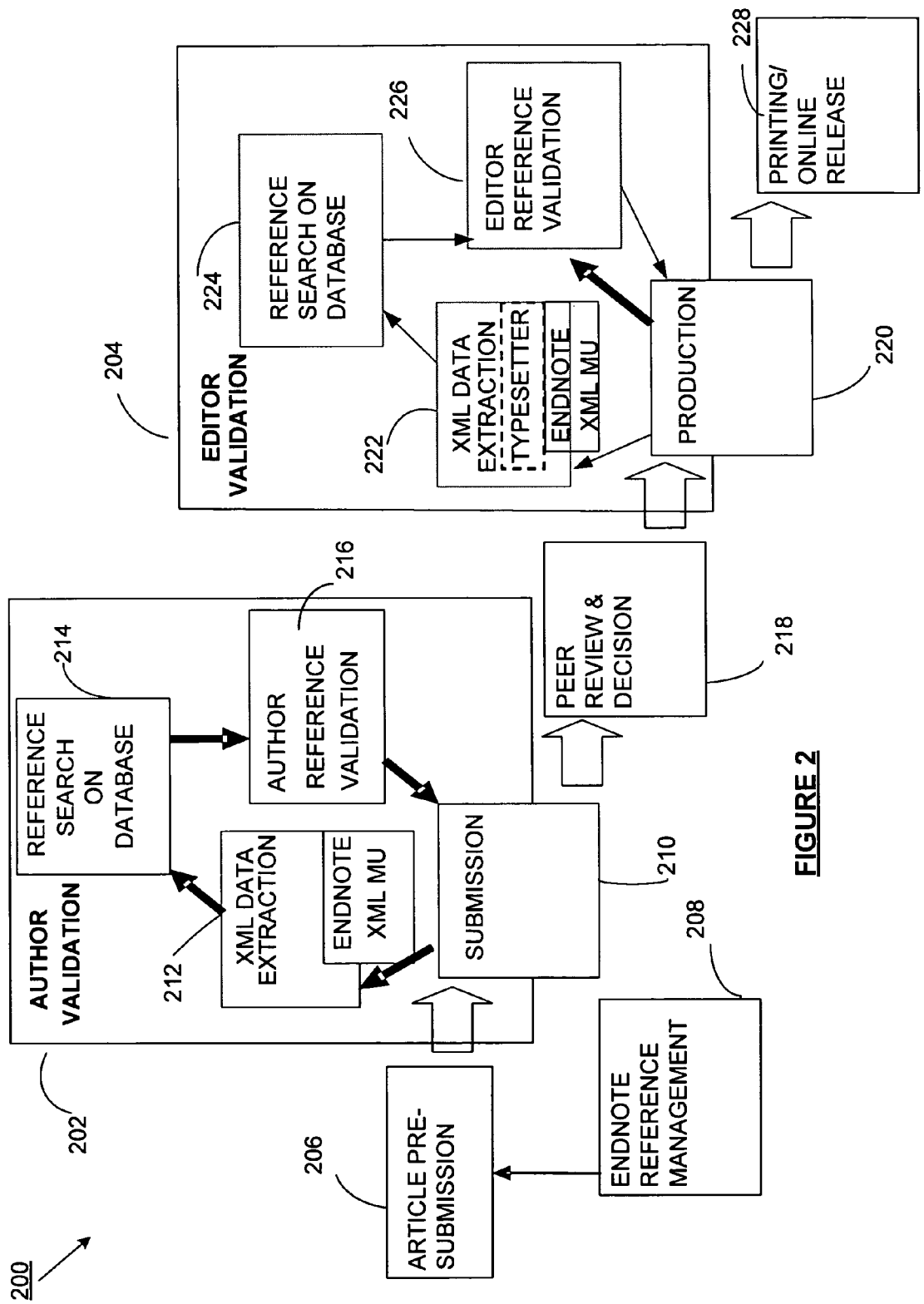
FIG. 2 is a schematic diagram further illustrating reference extraction and validation techniques of the present invention.

Now with reference to FIG. 2, the validation process, generally referenced as 200, may be carried out prior to submission by author validation 202 and/or it may be carried out after submission by publisher/editor validation 204. In the author validation process 202, initial review and validation is carried out by the author prior to manuscript submission 210. Author validation 202 may be followed by secondary review and validation by a production editor or other actor associated with the publisher post submission. In the Editor validation process 204, the submitted document is reviewed and validated by a production or copy editor. Ideally, journals and other publishers would prefer authors to perform the initial validation as essentially validating the manuscript's cited references prior to submission. However, cost and difficulty associated with parsing cited references into XML at the submission stage may deter authors from taking on this added burden. In addition, a publisher may desire to retain the practice of using a typesetter to markup references. However, as more effective author tools become widely available and used and as the creation, submission and validation processes become more integrated and/or open, the many benefits automated validation has to offer are likely to outweigh and supplant prior practices.

Referring to FIG. 2, the following major components comprise the author validation system 202. A reference management module or service 208, e.g., EndNote, may be used to produce a structured document with tagged references prior to submission 206. Alternatively, third-party XML production software and services may be used to automate the markup process. Extraction based on the XML production software used and the tagging format occurs pre-submission to allow author validation. At article submission block 210, the document, structured or not, may be handled in either of two ways. The document may be passed directly on for peer review and decision at block 218 and then submitted to a publisher at Production block 220 without pre-submission author validation. Alternatively, for self-validation by the author, the document may be processed by XML data extraction block 212. The cited reference data may be extracted using a number of different methods, including EndNote reference XML for a document formatted using the EndNote process. Also, a software module may process the document to identify references and extract them into XML. In one manner, the extracted reference data is compiled into a reference list. Reference lists may be held in detailed and standardized XML. Getting the reference list into XML may be dependent upon the markup language used to produce the structured document. Tables 1 and 2 below, depict an excerpt from a document marked up using EndNote Reference XML. Table 1 shows the excerpted text without the mark-ups and Table 2 shows the same excerpted text with mark-ups.

TABLE 1

A large number of extracellular mediators and their corresponding receptors have been established to induce mechanical hyperalgesia (Woolf & Slater, June 9; Julius & Basbaum, Sep. 13, 2001). However, the underlying intracellular signaling mechanisms remain to be explored in detail. We investigated the mechanism by which the endogenous mediator estrogen modulates PKC-dependent inflammatory hyperalgesia.

TABLE 2

A large number of extracellular mediators and their corresponding receptors have been established to induce mechanical hyperalgesia { ADDIN EN.CITE <EndNote><Cite><Author>Julius</Author><Year>2001</Year><RecNum>471</RecNum><record><rec-number>471</rec-number><ref-type name="Journal Article">17</ref-type><contributors><authors><author>Julius,D.</author><author>Basbaum,A.I.</author></authors></contributors><auth-address>Department of Cellular and Molecular Pharmacology, University of California San Francisco, San Francisco, California 94143, USA</auth-address><titles><title>Molecular mechanisms of nociception</title><secondary-title>Nature</secondary-title></titles><periodical><full-title>Nature</full-title></periodical><pages>203-210</pages><volume>413</volume><number>6852</number><keywords><keyword>Brain</keyword><keyword>injuries</keyword><keyword>Molecular</keyword><keyword>Neurons</keyword><keyword>pharmacology</keyword><keyword>Sensation</keyword><keyword>Spinal TABLE 2-continued Cord</keyword></keywords><dates><year>2001</year><pub-
dates><date>9/13/2001</date></pub-
dates></dates><label>487</label><urls><related-urls><url><style face="underline"
font="default" size="100%">E:\Labor\Endnote\PDFs\487.pdf</style></url></related-
urls></urls></record></Cite><Cite><Author>Woolf</Author><Year>2000</Year><Rec
Num>1540</RecNum><record><rec-number>1540</rec-number><ref-type
name="Journal Article">17</ref-type><contributors><authors><author>Woolf, C.
J.</author><author>Salter, M. W.</author></authors></contributors><auth-
address>Neural Plasticity Research Group, Department of Anesthesia and Critical
Care, Massachusetts General Hospital and Harvard Medical School, MGH-East,
Charlestown, MA 02129, USA. woolf.clifford@mgh.harvard.edu</auth-
address><titles><title>Neuronal plasticity: increasing the gain in
pain</title><secondary-title>Science</secondary-title></titles><periodical><full-
title>Science</full-title></periodical><pages>1765-
9</pages><volume>288</volume><number>5472</number><keywords><keyword>Animals
</keyword><keyword>Human</keyword><keyword>Inflammation/physiopathology
</keyword><keyword>Models, Neurological</keyword><keyword>*Neuronal
Plasticity</keyword><keyword>Neurons,
Afferent/*physiology</keyword><keyword>Nociceptors/physiology</keyword><keyword
>Pain/*physiopathology</keyword><keyword>Peripheral
Nerves/injuries</keyword><keyword>Posterior Horn
Cells/*physiology</keyword><keyword>Signal
Transduction</keyword><keyword>Synaptic
Transmission</keyword></keywords><dates><year>2000</year><pub-
dates><date>Jun 9</date></pub-dates></dates><accession-
num>10846153</accession-num><urls><related-
urls><url>E:\Labor\Endnote\PDFs\1540.pdf</url></related-
urls></urls></record></Cite></EndNote>}. However, the underlying intracellular
signaling mechanisms remain to be explored in detail. We investigated the
mechanism by which the endogenous mediator estrogen modulates PKC-dependent
inflammatory hyperalgesia.

Preferably, the XML extraction block 212 is configured to recognize and process documents marked-up in multiple formats and to accommodate documents from a variety of reference management software or XML production software. In this manner the system 200 facilitates a range of client needs and does not require the client to abandon elements of their workflow. The extracted reference data output from block 212 is compared against an authority database at Reference Search on Database block 214, which may involve online access to one or more authority databases, and then the validation results of the comparison are presented to the author/user via Author reference validation block 216. The author/user may then take action based on the results, including submitting the paper with the results to the publisher. One goal is to have the validation process recognized within the publishing industry so that a favorable validation report would amount to a "seal of approval" widely accepted by publishers such that a high level of reliance is placed on the results and additional manual or automated validation is not required by the publisher.

The validation results may include confirmation of correct references validated as having actual papers corresponding to the cited reference data. The system can give an indication of verification, identify which references have or have not been validated, delineate the data or fields in the cited reference or document that appear to be incorrect, and suggest closely matching reference data as a substitute or correction for the erroneous data. The system can also include hyperlinks, for example, associated with the cited references to directly link the results page with the actual, confirmed reference or a suggested reference. The system can also give authors the ability to revise, edit, or correct cited reference data and resubmit for further validation. The invention is not limited to validating authors, citations, dates, etc. and can be used to validate any feature appearing in a cited reference or even a paper for which there is a corresponding authority database against which the data may be compared. For example, if an author claims to be a "Fellow" or "Member" of a society, e.g., IEEE, or a member of the faculty of a school or in a chaired position, for example, then as long as the system 200 has access to an authority database of membership data for that society or faculty, the information from the paper or other document may be extracted, marked-up or otherwise, and may be compared against the database and the data validated. In addition, these processes may be used to validate that the paper has not previously been published. As part of the process, a user can select from a list of databases against which the validation process is to be performed or the system may default to a predefined set of one or more databases. Exemplary databases for use with the present invention include public reference databases, e.g., CrossRef, and National Library of Medicine (NLM) PubMed; commercial databases, e.g., ISI Web of Science (WoS), ISI Web of Knowledge (WoK), and BIOSIS; and privately held specialized and other databases, including Dialog, library Online Public Access Catalogues (OPACs), Medline, ProQuest, Ovid, Ebsco, and WilsonWeb and similar reference databases.

In the event a document is not author self-validated and is merely passed on to the publisher for Editor Validation 204 via Production block 220, then the publisher may validate the cited references contained in the submitted document. XML data extraction block 222 works essentially the same as corresponding block 212 previously described in the author validation process 202. In addition to the EndNote reference management software and third-party software previously discussed, publishers often use typesetters to extract reference data. This option is reflected in block 222. The extracted reference data from block 222 is compared against an authority database at Reference Search on Database block 224, as previously described for block 214, and then the validation results of the comparison are presented to the editor/user via Editor reference validation block 226. Alternatively, the paper may be submitted along with a list of references, or the list may be submitted apart from the paper, and the list may be processed for validation. In addition to the description of the comparison results and actions above, the publisher/editor may send some or all of the results back to the author or to another for follow-up, e.g., correction or further verification.

Preferably, reference databases used for validation are local or available via the Internet or other communications network to allow the Author Validation 202 and Editor Validation 204 processes to search on them. Traffic requirements are likely to be significant as for example using an average 60-80 references per article times 1,800 articles per day yields on the order of 100,000 to 150,000 requests per day. User interfaces (UI) support the validation task of reviewing reference matches and indicating which matches are correct and which are not. Two exemplary versions of UIs are author UI and editor UI. As part of the author pre-submission process 206, reference management process 208, or author validation process 202 or as part of the editor validation process 204, metadata, tagging or links, e.g., DOIs (digital object identifiers) or URLs, may be inserted or validated to provide or confirm cross-publisher/database linking imbedded in the final paper or bibliography. Other elements associated with the validation process include search logic for reference retrieval from database.

Figure 3:
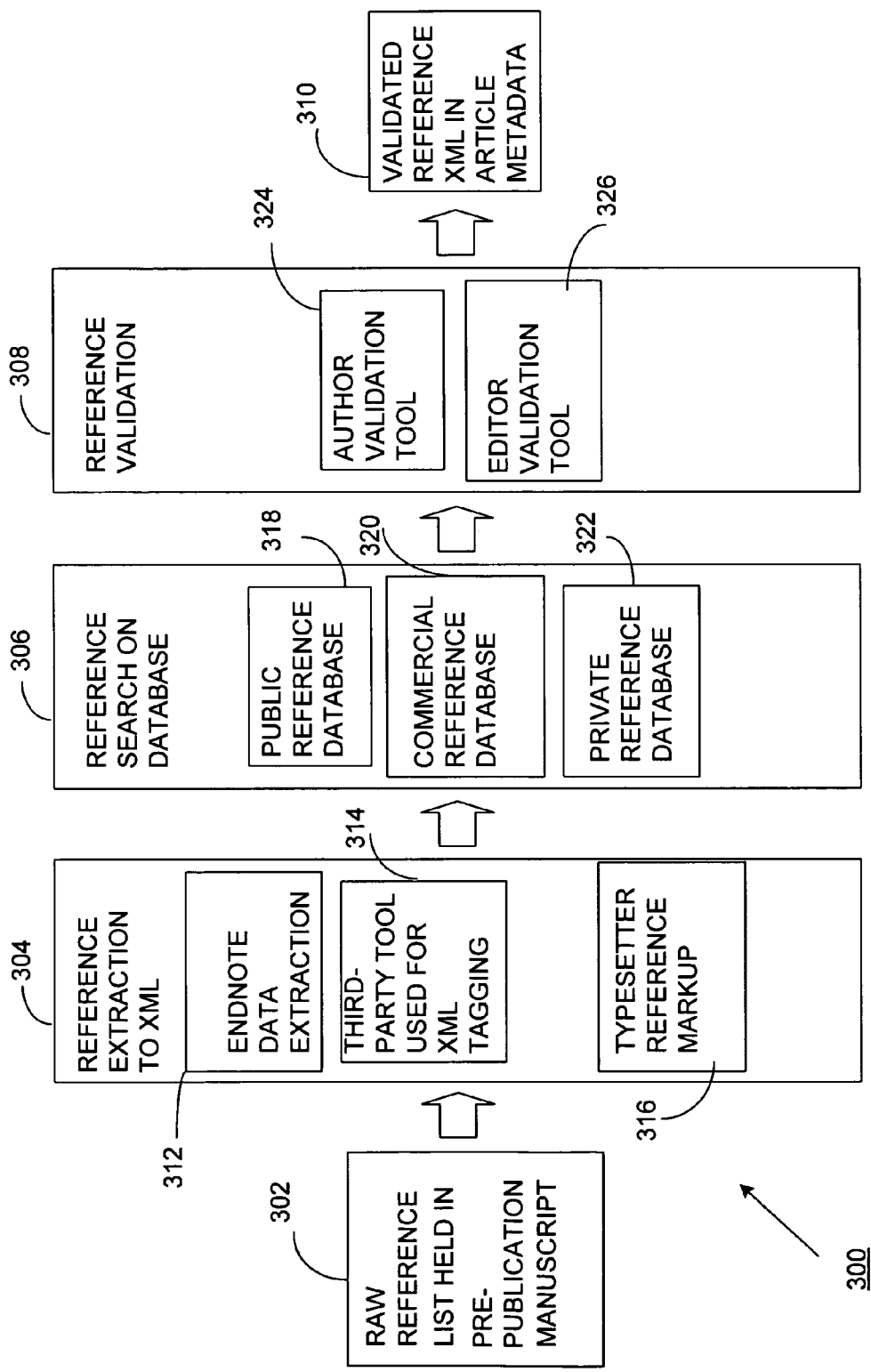
FIG. 3 is a schematic diagram illustrating reference extraction and validation techniques of the present invention.

Now with reference to FIG. 3, another depiction of a submission and validation process 300 is shown in which block 302 represents a pre-publication "raw" reference list that is input to and processed at block 304 wherein the references are extracted to XML. After the reference list is extracted into XML, the references are compared at block 306 against one or more authority databases, e.g., WoS, WoK, PubMed, OPACs, and CrossRef. Next, the results of the reference comparison are presented for further validation as represented at block 308. After the final validation by the author/editor, the validated references or list of references in XML are included in the article/manuscript metadata at block 310. At this point the document is ready for submission to a publisher (if author validated) or ready for publishing (if editor validated).

With respect to block 304, the references or reference list may be extracted to XML consistent with one or more reference management module, structured format, or service utilized. For instance, a paper and reference list prepared using EndNote, would rely on an EndNote data extraction 312. Alternatively, third-party XML production software and services may be used for XML tagging 314. As relates to the publisher perspective, a third-party typesetter may be used to convert the cited reference data to XML structured format as represented at block 316.

The extracted reference data from block 304 is compared against one or more authority database at Reference Search on Database block 306. The reference databases used for validation may be local or available via the Internet or other communications network and as described elsewhere herein. Exemplary databases for use with the present invention include public reference databases 318, e.g., CrossRef, and PubMed; commercial reference databases 320, e.g., Web of Science (WoS), Web of Knowledge (WoK), and BIOSYS; and privately held specialized reference databases 322. Other exemplary databases include: Medline, ProQuest, Ovid, Ebsco, and WilsonWeb.

With respect to Reference Validation block 308, the validation results of the comparison block 306 are presented to the author/editor/user for examination and/or for taking action based on the results. User interfaces, as described above and generally known, may be used as part of Author validation tool 324 and/or Editor validation tool 326. Author action may include submitting the paper with the results to the publisher. Editor action may include approving the paper for publication or returning the results to the author for correction or explanation. Action may also include confirmation of correct references validated as having actual published papers corresponding to the cited reference data.

After reference validation 308, the validated references or list of references in XML may be included in the article/manuscript metadata at block 310. With respect to author validation, the article/manuscript with tagged XML references may be submitted to a publisher for acceptance or further validation such as for quality assurance by the publisher. With respect to editor/publisher validation, the article, with tagged references, is ready for approval and publishing—at least with respect to having a validated set of references cited in the paper.

Figure 4:
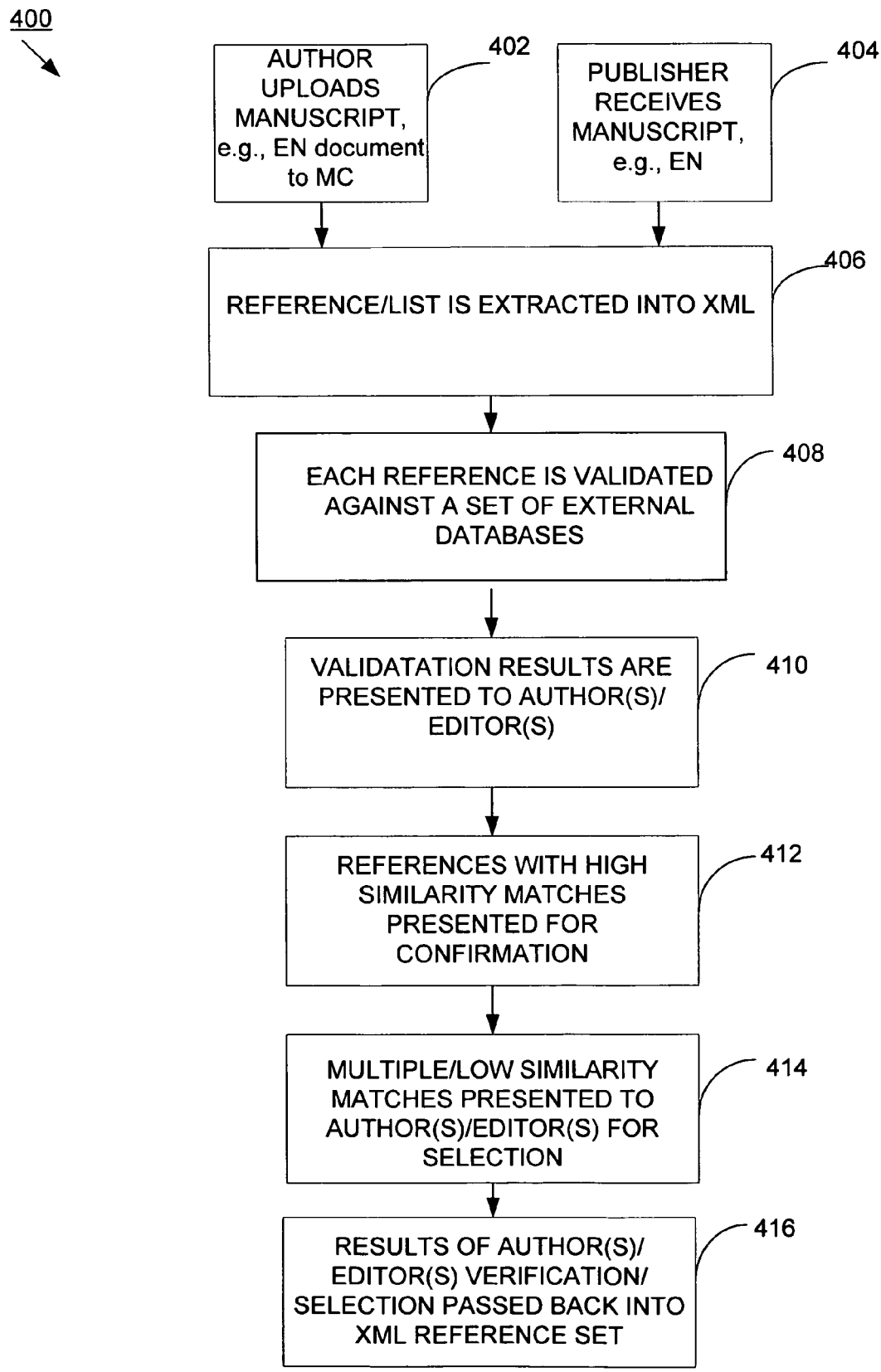
FIG. 4 is a logic flow diagram further illustrating reference extraction and validation linking techniques of the present invention.

With reference to FIG. 4, a dual path flow chart is provided that illustrates one exemplary embodiment of a reference validation process using the present invention. As shown, reference validation process 400 may be initiated by an author at 402 who may upload a manuscript structured, for example using EndNote, to a central service, for example Manuscript Central, for reference validation prior to submission to a publisher. Alternatively, a publisher may initiate the process at 404 post submission and in the production phase prior to publication. Other than the initial steps of 402 and 404, which is directed to the source of the paper and the entity performing the reference validation, the remaining steps are essentially the same for both paths. Depending on whether an author has conducted an initial validation process or submits the paper or reference list in a recognized structured form, e.g., EndNote, or in an extracted condition, some of the steps may not be necessary for the editor.

At step 406, references are or a reference list is extracted from the document into XML, preferably based on a known and recognized format structure. At step 408, each extracted reference is validated against a set of one or more external databases, such as journal-configured database. At step 410, validation results are presented to authors and/or editors and may include references which have high similarity matches, step 412, and references having multiple or low similarity matches, at step 414, presented for confirmation by the author or editor. At step 416, results of author verification/selection are passed back into the XML reference set.

Figure 5:
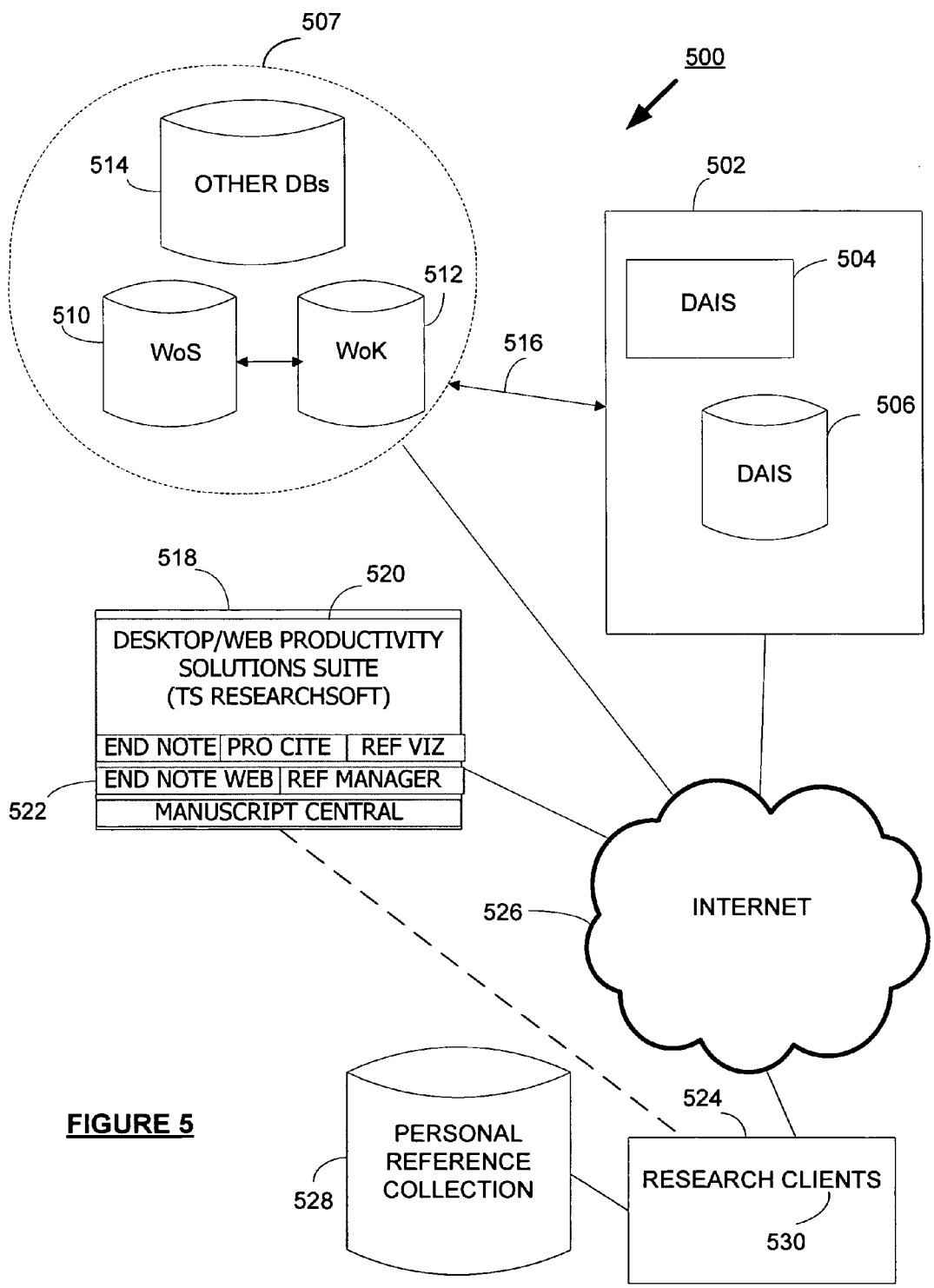
FIG. 5 is a schematic diagram of an authoring, submission, and validation system utilizing the reference extraction and validation techniques of the present invention.

With reference to FIG. 5, one exemplary embodiment of a Content Management System (CMS), referenced generally with reference number 500, includes a "Distinct Author Identification System" (DAIS) 502, also referred to as an Author Disambiguation System, a source of information 507, e.g., databases 510, 512 and 514, software and processor driven user productivity suite 518, a plurality of remote users or clients 524 and various communications links. CMS enables users to search for, identify and access items, such as papers and other publications, by certain attributes associated with those items. For instance, a typical user search is based on author name often and only includes author last name and perhaps first and middle initials. This abbreviated and non-unique author information does not uniquely identify the author from the universe of author names contained in the source or database. The purpose of DAIS 502 is to disambiguate records stored in source 507 to, among other things, identify distinct authors; assign author identifiers (ids) to them; and tag their authorships with their author ids to facilitate such searching by users 524.

In this exemplary embodiment of FIG. 5, the sources available for searching include the WoS Database 510, the WoK Database 512 and a general reference to other databases of interest 514, such as OPAC, CrossRef, and PubMed databases and others mentioned herein for example. The DAIS 502 communicates with stores 507 via a communications link 516 and captures and uses for disambiguation processes instances of all or portions of such databases. The DAIS 502 applies the DAIS rules and processes, referenced generally by reference number 504, against the records stored in such databases to arrive at accurate relational links and clusters of links to properly associate with author entities.

For purposes of explaining the overall process and not by way of limitation to the invention, the WoS DB 510, for example, is an XML database that spans a range of years of data, including scientific papers and citations associated therewith. The WoS DB instance used by DAIS 502 is separate from the WoS DB 510, which may be used by WoS customers and which is kept for independent and unaltered research, testing or various special processing. There are two principal unit records in this database. They are <item> (source item) and <ref> (reference item).

Once the DAIS 502 has applied its processes 504 against and across the database instances from sources 507, it may load onto such databases 510, 512, and 514 the disambiguated records and data as a way to improve the integrity of the information stored in such databases and for subsequent use by users. For instance, users, such as remote users 524 and others, may invoke productivity solutions 518, such as Thomson Scientific's ResearchSoft suite, in carrying out the business of science and research and in authoring works associated with those efforts. These productivity tools may be desktop-based, network-based or a combination thereof and may be involved in the process of creating a manuscript for publication. For example, the user may use EndNote and other productivity tools to create a structured document using XML references which may be validated, e.g., by comparing against sources 507. Also, such productivity tools may be used by administrators, such as faculty and university administration, in conducting the business of the institutions, for example in reviewing the work of faculty up for tenure and under review, including checking the validity of cited references contained in papers authored by a faculty member under review. Researchers may keep a personal reference collection 528 of works of their own, of works relied on and referenced in their works, and of works of interest in their particular fields of study.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-based method for preparing a document for publication, the method comprising:
   receiving an electronic document previously prepared by an author using a markup formatting structure, the electronic document including a set of cited references and having a descriptive metadata associated with a set of components of the set of cited references embedded in accordance with the markup formatting structure; and
   executing on the electronic document a reference validation process adapted to recognize the markup formatting structure and the embedded metadata and further adapted to extract the embedded metadata and compare the extracted metadata against a set of at least one authority database to determine the validity of the set of cited references.

2. The method of claim 1 further comprising generating an output comprising data representing the validity determination.

3. The method of claim 2 wherein the output further comprises data representing an option to revise invalid cited reference data, the output being presented to one or both of the author and a publisher for revising at least one invalid cited reference datum and generating a revised set of data.

4. The method of claim 3 further comprising executing on the revised set of data the reference validation process for further validation.

5. The method of claim 2, wherein the output comprises data respecting one or both of at least one valid cited reference and at least one invalid cited reference and comprises at least one of the following: error data; suggested correction data; and data related to confirmed citations that match closely with data from the set of cited references.

6. The method of claim 1 wherein the electronic document is received by a publisher and the publisher causes the reference validation process to be executed on the electronic document prior to publication of the electronic document.

7. The method of claim 1 further comprising parsing data from the set of cited references and comparing the parsed data with data from the set of at least one authority database to determine the validity of the parsed data.

8. The method of claim 1, wherein the set of at least one authority database includes at least one of the following databases: ISI Web of Science, ISI Web of Knowledge, National Library of Medicine PubMed, CrossRef, BIOSIS, Dialog, library OPACS, Medline, ProQuest, Ovid, Ebsco, and WilsonWeb.

9. The method of claim 1, wherein the electronic document is received from an author and the method is performed to validate the set of cited references contained in the electronic document prior to submission of the electronic document to a publishing entity.

10. The method of claim 1 further comprising: creating the electronic document according to the formatting structure including inserting the embedded metadata in the electronic document.

11. The method of claim 1, wherein the electronic document includes formatted data elements associated with citation information associated with the set of cited references, the method further comprising parsing the formatted data elements based on the formatting structure to yield parsed data and comparing the parsed data with data from the set of at least one authority database to determine the validity of the parsed data.

12. The method of claim 1, wherein the formatting structure is a markup process based on one of XML, GML, and SGML.

13. The method of claim 1 further comprising establishing a communication link with the set of at least one authority database over at least one computer network.

14. The method of claim 1, wherein the set of cited references comprises one or more of citation data, author data, publication source data, address data, volume data, ISSN, volume, issue, page, DOI, URL, and date of publication data.

15. The method of claim 1 further comprising:
  determining a set of at least one invalid data from the set of cited references;
  revising at least a portion of the set of at least one invalid data to form a set of revised data; and
  automatically comparing the set of revised data against the set of at least one authority database to determine the validity of the set of revised data.

16. The method of claim 1 further comprising:
  determining a set of at least one invalid data from the set of cited references;
  presenting a user with the set of at least one invalid data;
  receiving from the user a set of revised data; and
  automatically comparing the set of revised data against the set of at least one authority database to determine the validity of the set of revised data.

17. The method of claim 1, wherein determining the validity of the set of cited references is based solely on the extracted embedded metadata.

18. The method of claim 1, wherein the embedded metadata is hidden and does not include visible text.

19. The method of claim 1, wherein the extracting, comparing and determining aspects of the reference validation process occur without user intervention.

20. A system for preparing electronic documents for publication, the system comprising:
  a. a processor adapted to process at least one electronic document containing a set of at least one cited reference, the electronic document being previously prepared by an author using a markup formatting structure and having a descriptive metadata associated with a set of components of the set of at least one cited reference embedded in accordance with the markup formatting structure; and
  b. a reference validation software module comprising code executed by the processor and adapted to automatically recognize the markup formatting structure and the embedded metadata and further adapted to automatically extract the embedded metadata and compare the extracted metadata against a set of at least one authority database to determine the validity of the set of at least one cited reference.

21. The system of claim 20, wherein the set of at least one authority database includes at least one of the following databases: ISI Web of Science, ISI Web of Knowledge, National Library of Medicine PubMed, CrossRef, BIOSIS, Dialog, library OPACS, Medline, ProQuest, Ovid, Ebsco, WilsonWeb, and a journal-configured external database.

22. The system of claim 20 wherein the reference validation software module is adapted to determine the presence of a set of at least one invalid data from the set of at least one cited reference, process a set of revised data; and automatically compare the set of revised data against the set of at least one authority database to determine the validity of the set of revised data.

23. The system of claim 22 wherein the set of at least one invalid data is presented to a user and the user revises at least a portion of the set of at least one invalid data to form the set of revised data.

24. The system of claim 20 wherein the formatting structure is based on one of XML, GML, and SGML.

25. The system of claim 20 further comprising an output software module comprising code executing on the processor and adapted to automatically generate an output respecting the validity of the set of at least one cited reference.

26. The system of claim 25, wherein the output comprises data respecting one or both of at least one valid cited reference and at least one invalid cited reference.

27. The system of claim 25, wherein the output includes data representing one or both of a match or a failure to match between the set of at least one cited reference and the valid reference data.

28. The system of claim 25, wherein the reference validation software module further comprises code executed by the processor and adapted to automatically determine a similarity between each of the set of at least one cited reference and the valid reference data, and wherein the output includes data respecting at least one possible match between the set of at least one cited reference and the valid reference data.

29. The system of claim 28 wherein the output indicates those of the set of at least one cited reference having one or more possible matches with the valid reference data and presents the possible matches for selection by a user.

30. The system of claim 28 wherein the output is presented to a user for action and the user provides at least one response respecting validation of the set of at least one cited reference.

31. The system of claim 30 wherein the at least one user response includes at least one of a verification, a repudiation, or selection respecting the at least one possible match.

32. The system of claim 20 further comprising:
  an author computer adapted to structure the electronic document according to the formatting structure; and
  a central computer comprising the processor and being adapted to receive the electronic document.

33. The system of claim 32, wherein the central computer further comprises a parser adapted to parse data contained in the electronic document associated with the set of at least one cited reference to yield parsed cited reference data, and wherein the reference validation software module uses the parsed cited reference data to compare the set of at least one cited reference against the set of at least one authority database.

34. The system of claim 33, wherein at least one of the author computer and the central computer is adapted to process the electronic document using a structured format language.

35. The system of claim 20, wherein the reference validation software module is adapted to extract the metadata into XML.

36. The system of claim 20, wherein the set of at least one authority database includes at least one journal-configured external database.

37. The system of claim 20, wherein the reference validation software module is further adapted to present to a user data related to the validity determination and to receive from the user verification data associated with the set of at least one cited reference.

38. The system of claim 37, wherein the data related to the validity determination includes data representing authenticated references contained in the set of at least one authority database and having high similarity with at least a portion of the set of at least one cited reference.

39. The system of claim 37, wherein the verification data is used to revise the electronic document.

40. The system of claim 20, wherein determining the validity of the set of cited references is based solely on the extracted embedded metadata.

41. The system of claim 20, wherein the embedded metadata is hidden and does not include visible text.

42. The system of claim 20, wherein the extracting, comparing and determining aspects of the reference validation software module occur without user intervention.

43. A computer-based method for preparing a document for publication, the method comprising:
  receiving a set of hidden descriptive metadata embedded in an electronic document in accordance with a markup formatting structure, the hidden descriptive metadata relating to a set of references cited in the electronic document;

executing by a processor a reference validation process adapted to:

recognize the markup formatting structure and the embedded hidden descriptive metadata;

upon recognizing the markup formatting structure and the embedded hidden descriptive metadata, extract the embedded hidden descriptive metadata; and compare the extracted metadata against a set of at least one authority database to determine the validity of the set of cited references.

* * * * *